United States Patent
Dressel et al.

[11] Patent Number: 5,294,396
[45] Date of Patent: Mar. 15, 1994

[54] METHOD OF MAKIKNG ANODE PROTECTOR

[75] Inventors: David C. Dressel, Friendswood; James H. McBrien, Houston; Richard L. Wyke, Missouri City, all of Tex.

[73] Assignee: Foam Enterprises, Inc., Minneapolis, Minn.

[21] Appl. No.: 970,634

[22] Filed: Nov. 3, 1992

Related U.S. Application Data

[62] Division of Ser. No. 715,363, Jun. 14, 1991, Pat. No. 5,164,058.

[51] Int. Cl.$^5$ ............................................. B29C 45/14
[52] U.S. Cl. ................................. 264/240; 264/257; 264/259; 264/271.1; 264/328.6; 264/331.19
[58] Field of Search ............... 264/257, 259, 240.1, 264/271.1, 331.19, 328.6

[56] References Cited

U.S. PATENT DOCUMENTS

| | | | |
|---|---|---|---|
| 2,863,819 | 12/1958 | Preiser | 204/196 |
| 3,043,765 | 7/1962 | Bryan et al. | 204/196 |
| 3,060,259 | 10/1962 | Flower et al. | 174/84 |
| 3,098,027 | 7/1963 | Flower | 204/196 |
| 3,484,517 | 12/1969 | Ligon et al. | 264/259 |
| 3,834,458 | 9/1974 | Bilbro et al. | 264/271.1 |
| 3,983,064 | 9/1976 | Olstowski | 524/712 |
| 4,246,363 | 1/1981 | Turner et al. | 521/163 |
| 4,370,211 | 1/1983 | Hybler | 204/197 |
| 4,395,159 | 7/1983 | Karuks et al. | 405/158 |
| 4,474,900 | 10/1984 | Dominguez | 521/156 |
| 4,590,971 | 5/1986 | Webster et al. | 138/149 |
| 4,725,165 | 2/1988 | Langran | 264/271.1 |
| 4,738,812 | 4/1988 | Raynal | 264/262 |

*Primary Examiner*—Jay H. Woo
*Assistant Examiner*—Duane S. Smith
*Attorney, Agent, or Firm*—Ned L. Conley

[57] ABSTRACT

A method for making a protector to prevent galvanic anodes from being accidentally knocked off a pipeline in which a mold having a frusto-conical shape is placed around each end of a segmented anode, with an opening at the top of the mold opposite a gap between anode segments, liquid components of a rapid setting elastomeric polymer are injected into the opening until all of the cavities and the gap are filled, and the polymer is allowed to set up and adhere to the anode and to the pipe.

8 Claims, 4 Drawing Sheets

METHOD OF MAKIKNG ANODE PROTECTOR

This application is a division of application Ser. No. 07/715,363 filed Jun. 14, 1991, now U.S. Pat. No. 5,164,058 issued Nov. 14, 1992.

This invention relates to a means and method for preventing damage to galvanic anodes and their electrical connections mounted on a pipeline to be laid in an underwater location.

BACKGROUND OF THE INVENTION

When pipelines are laid under water, particularly offshore in sea water, they are usually protected against galvanic corrosion by attaching galvanic anodes made of materials such as zinc or aluminum. These anodes will preferentially corrode and thereby protect the pipeline against corrosion. Such anodes usually consist of two or more arcuate segments which encircle the pipe. Pipelines larger than about 12 inches in diameter are commonly coated with a thick layer of concrete to weight the pipeline down in the water. On these, the anodes are placed in gaps in the concrete, and do not extend above the surface of the concrete. Smaller pipelines, however, will sink of their own weight, so concrete coatings are not used. On these, the anodes have a substantially larger diameter than the pipeline. The anode protector of this invention is designed for this type of installation.

Offshore pipelines are commonly laid from a continuously moving vessel known as a lay barge. On some lay barges the joints of pipe making up the pipeline are welded together on the barge. On others, known as reel type lay barges, the joints of pipe are welded together on shore and coiled up in a coil as much as 300 feet in diameter on the lay barge. The anodes are attached to the pipeline while it is still on shore or after it is put on the lay barge. In either case, the pipeline is continuously fed off the stern of the barge as the barge moves forward in the water. The forward motion of the barge causes the pipeline to be pulled off the stern of the barge by the weight of the pipe depending from the barge. To facilitate movement of the pipeline on the deck of the steel barge, it is sometimes supported on two or more sets of rollers which are mounted on the deck. Each set of rollers may consist of two pairs of automobile wheels with rubber tires set to engage and support the pipeline. The pipeline then moves down an elongate cradle, or "stinger", which extends rearwardly and downwardly from the lay barge toward the bed of the body of water. In some cases, the weight of pipe depending from the barge is great enough to pull the pipeline off the barge too fast. In such cases a tensioning device is used to restrain the pipeline movement. Such tensioning devices may consist of spring-loaded tracks engaging the pipe, or sets of automobile tires, in either case with brakes applied as necessary to hold the pipe back.

It will be appreciated that due to wind, wave and current action there is often some lateral and vertical movement of the barge which makes it impossible to draw the pipeline off the barge in a smooth straight line at all times. The erratic motions produced under such circumstances often causes shock blows to the galvanic anodes as they pass over the rollers and down the stinger. Such shock blows tend to damage and tear the anodes loose from the pipeline. Whenever an anode is torn loose, it is necessary to stop the barge movement, weld the anode back on, and then restart the barge, all at great expense to the pipe laying operation.

In addition, the tensioning devices cannot pass over the anodes, so it is necessary to either put the anodes on after the pipe passes through the tensioner, or use two tensioning devices. If the latter option is chosen, every time an anode is reached during the laying of the pipeline, it is necessary to attach a second tensioning device on the other side of the anode, and then release the first tensioning device until the anode passes through. This is also a time-consuming and expensive operation. However, if it is not done, the axial load of the tensioner on the anode would tear it loose from the pipe. The alternative of welding the anodes on after the pipe goes through the tensioner is equally objectionable, because it slows down the laying of the pipe.

SUMMARY OF THE INVENTION

It is an object of this invention to provide a means and method for protecting the galvanic anodes on pipeline from being damaged during the laying of the pipeline.

Another object of the invention is to improve the corrosion protection of the pipeline adjacent to galvanic anodes.

Still another object of the invention is to provide a means for improving the bond between the anode and the pipe.

These and other objects of the invention are achieved according to the present invention by providing a molded in place taper at each end of each anode. The taper is made from a tough, fast setting polymer which will set up in a short time, often as little as three to five minutes, so that the pipe laying operation is not delayed. In a preferred embodiment the polymer is a fast setting polyurethane, having a low viscosity prior to polymerization, which not only forms the molded taper, but fills the space between the anode segments, and flows between the anode segments and the pipe. This material adheres to the pipe as well as to the anode material, so that it provides an additional corrosion barrier and bonds the anode segments to the pipe.

BRIEF DESCRIPTION OF THE DRAWINGS

As shown in FIG. 1 of the drawing, the pipeline 10 is being laid from the barge 12. A stinger 14 extends outwardly and downwardly from the stern 16 of the barge, with the pipeline resting on the rollers which comprise cross members 18 of the stinger and moving down these cross members as the barge moves forwardly in the water. On the deck of the barge the pipeline is supported by two sets of rollers 20. A galvanic anode 22 is mounted on the pipeline with an anode protector 24 on each end of the anode.

As shown in FIG. 3, the anode 22 consists of two arcuate anode segments 26 which are held together around the pipe 10 by means of steel straps 28 with ends 30 protruding into the two gaps between the edges of the anode segments A "pigtail" 32 consists of an electrically conducting wire which is welded to the strap ends 30 at 34 and welded to the pipeline at 36. The anode segments are made of a material which is higher on the electromotive scale than iron, and commonly are made of zinc or aluminum In the drawing, the segments are tapered at 38 at each end, each taper ending in a wall 40 which is perpendicular to the pipeline. Some anode segments, however, are not tapered, but are squared off at the ends.

Figure 1:
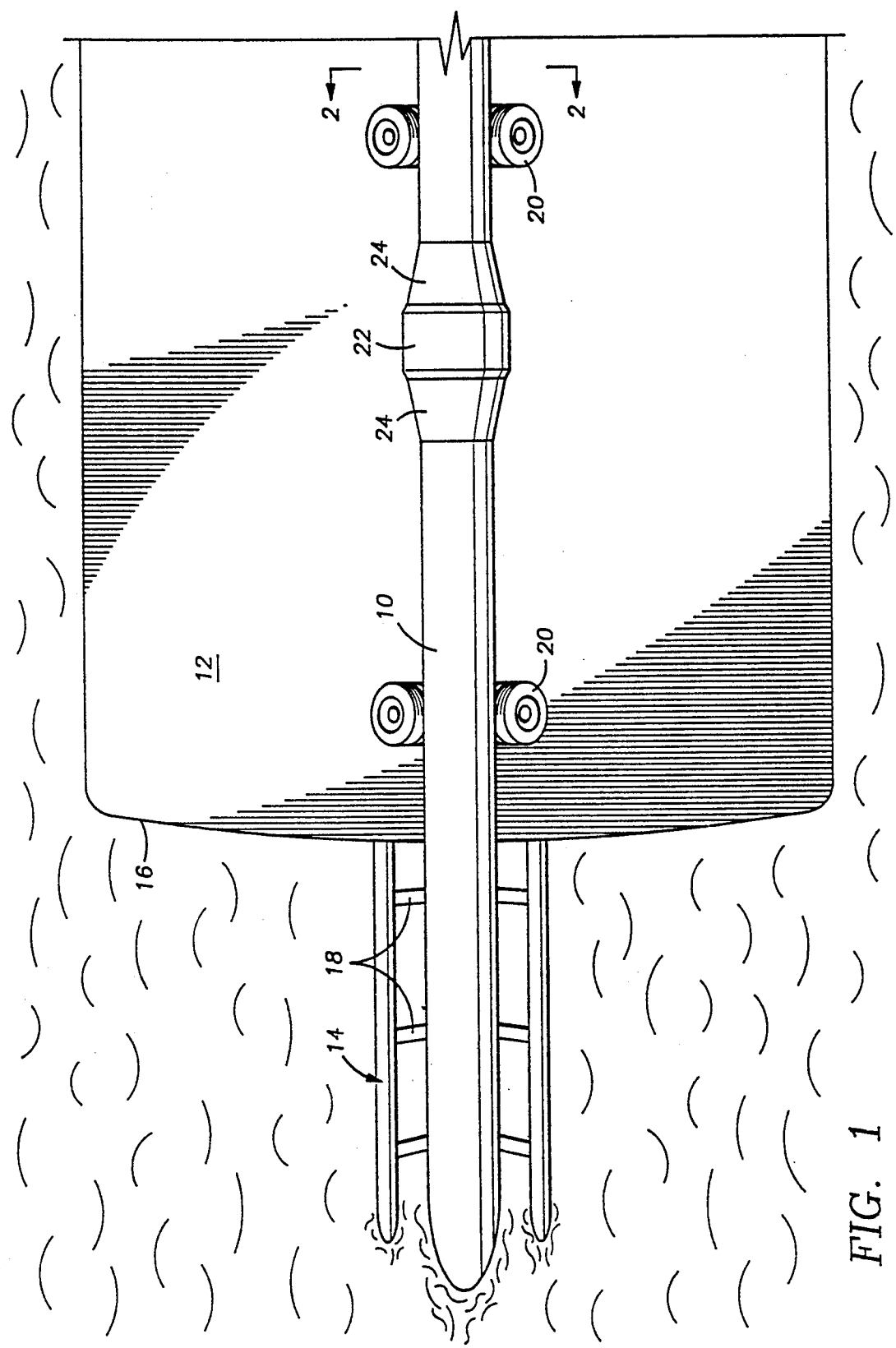
FIG. 1 is a plan view of the stern end of a lay barge showing a pipeline being laid from the barge.
Figure 4:
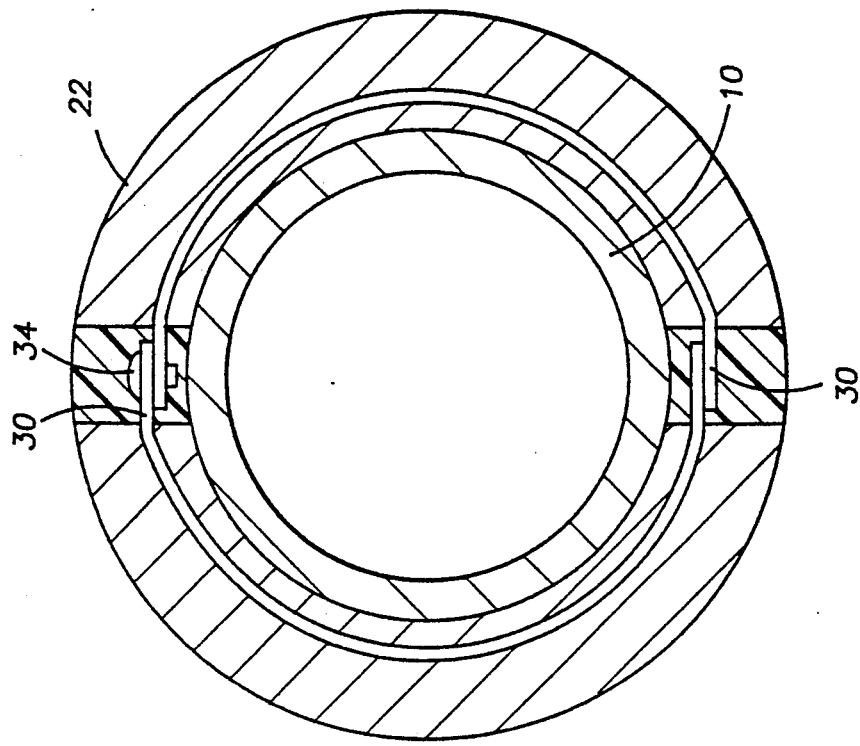
FIG. 4 is a vertical sectional view taken at line 4—4 of FIG. 3.
Figure 2:
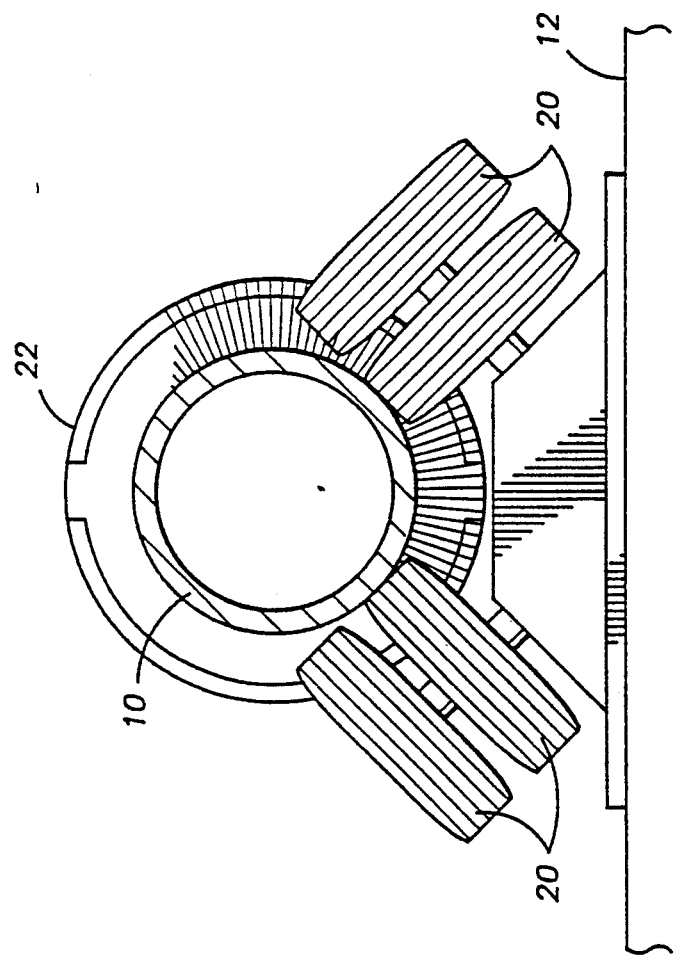
FIG. 2 is a vertical sectional view of a portion of the pipeline shown in FIG. 1.
Figure 3:
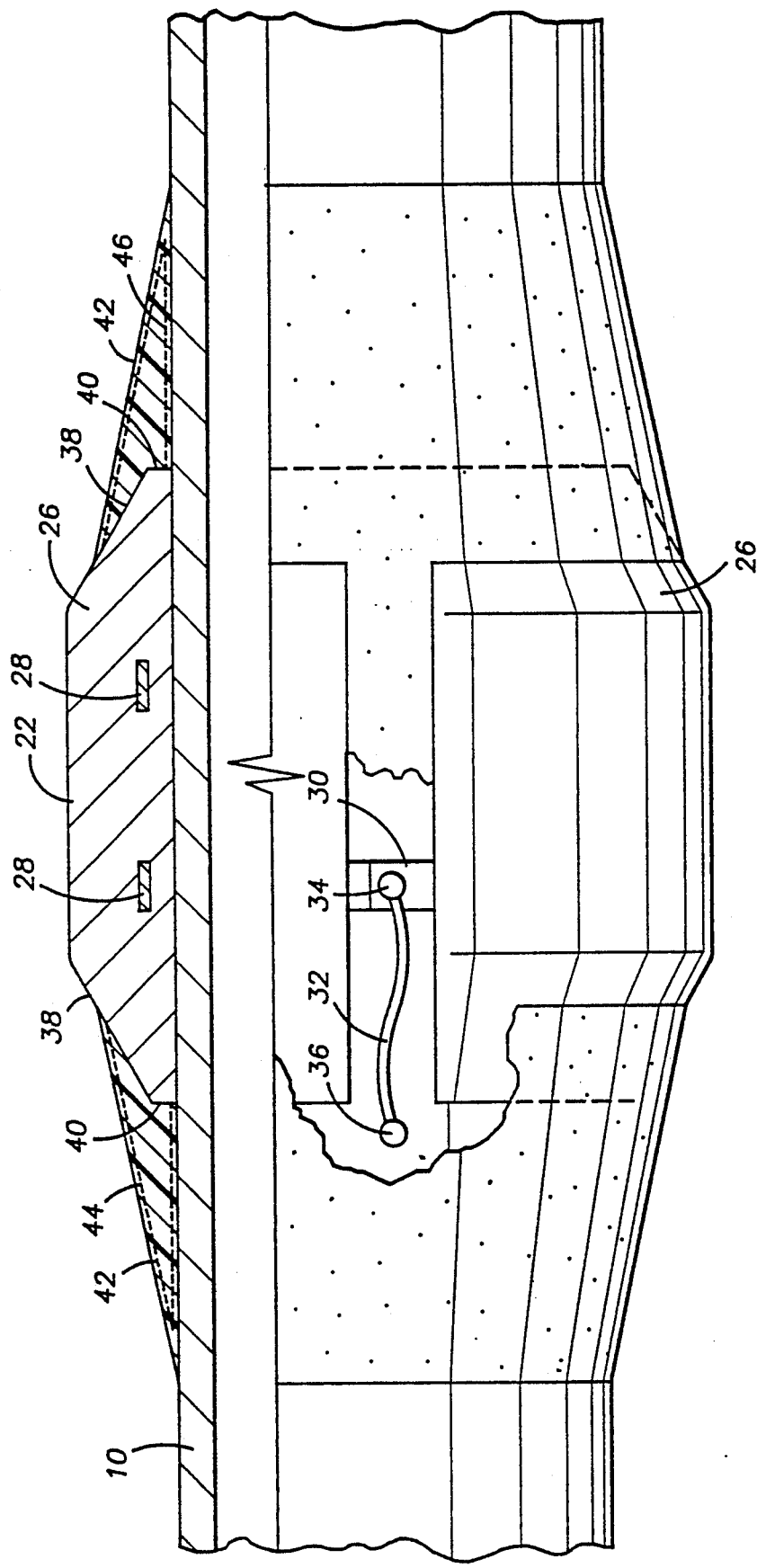
FIG. 3 is a sectional view of a portion of the pipeline showing a galvanic anode and one embodiment of the tapered protector of this invention.

According to this invention, a tapered protector 42 encircles the pipeline and encloses each end of the anode. The outer surface of each protector is tapered in a straight line from its intersection with the pipeline to a point on the taper 38 of each anode segment, enclosing the surface 40 and at least a portion of the taper 38 of the anode. The protector thereby provides a continuous tapered surface from the pipeline to the outer circumference of the anode segments.

In the embodiment shown in the drawing, the protector is formed from a cast in place fast setting elastomeric polyurethane. Preferably the protector also includes reinforcement adjacent the pipe surface, and it may also include reinforcement adjacent the outer surface of the protector. Such reinforcement may, for example, comprise a glass fiber mat or other reinforcing material which will reduce the possibility of cracking or fracture of the protector when it is hit by a hard blow. In the drawing the outer reinforcement is shown at 44 and the inner reinforcement adjacent the surface of the pipe is shown at 46.

The protector of this invention is made of a fast setting elastomeric polymer which will set up in a few minutes so that the pipe can be handled without fear of damage to the anode protector. Preferred polymers are rapid setting solid polyurethanes, as for example those prepared by the reaction of the polyhydroxyl containing compounds and the organic polyisocyanates described in U.S. Pat. Nos. 3,983,064, 4,154,716 and 4,246,363, the disclosures of which are incorporated herein by reference. Other suitable polymers include the rapid setting polyureas, for example those prepared by the reaction of amine terminated polyethers and the organic polyisocyanates described in U.S. Pat. No. 4,474,900.

The compositions of this invention preferably also include a liquid modifier, such as those described in the aforesaid patents. In addition, the compositions preferably include a liquid organic carbonate, and a sufficient amount of one or more catalysts to insure that the composition will set up in not more than about five minutes.

The reactants to produce these polymers have a low viscosity, not greater than about 100 centipoises, before polymerization, so that when they are fed into a mold to form the anode protectors around an anode, they will easily completly wet filler and reinforcing materials, and they will flow into very small clearances between the anode segments and the pipe, so that when the polymer sets up, it provides corrosion protection to the pipe and also increases the bond of the anode segments to the pipe.

In preparing the preferred polyurethanes, preferably an amine initiated polyol is used and more preferably a polyol is selected which has a hydroxyl number in the range of about 600 to about 900 and a minimum functionality of 4. One such material which can be obtained from Dow Chemical Company at Freeport, Tex. is sold under the trademark Voranol 800 and is the product of reacting ethylene diamine with 3 parts of propylene oxide and one part of ethylene oxide.

For the rapid setting polyureas, it is preferable to use an amine terminated polyether which has an equivalent weight in the range of 50 to 100 and a minimum functionality of 3.0. One such material which can be obtained from Texaco Chemical Co. is sold under the trademark JEFFAMINE T-403 and is fully described in U.S. Pat. No. 4,474,900.

The polymeric isocyanate used is preferably one which has a high vapor pressure for safety purposes. Dow Chemical Company sells a suitable material under the trademark PAPI 27 which is a crude polymeric isocyanate containing some methylene bis phenyl isocyanate and 50-60% polyethylene polyphenyl isocyanate.

The liquid modifier used is preferably a heavy aromatic solvent naphtha consisting primarily of C9 to C11 aromatic hydrocarbons. Such a product is available from Shell Chemical Company under the designation SC150 Solvent.

The liquid organic carbonate used may be one of those described in U.S. Pat. No. 4,154,716. Propylene carbonate has been found to give good results. The organic carbonates are known as plasticizers, and in the composition of this invention they reduce the propensity of the composition to shrink as it cures, and therefore reduces the tendency of the product to crack under stresses produced during curing. Other plasticizers which have been tried do not produce this advantageous result.

The reactants for preparing the composition of the invention are preferably prepared as two components. Component A consists of the polymeric isocyanate combined with the liquid modifier and a liquid organic carbonate. Component B consists of the polyhydroxyl compound or polyether combined with the liquid modifier and a small percentage of the liquid organic carbonate, together with an amount of catalyst sufficient to insure that the composition will set up in no more than about five minutes.

The catalyst used for polyurethanes may be any of the well known catalysts for polyurethane. A number of such catalysts are described in U.S. Pat. No. 4,246,363. The preferred catalysts for the polyurethane composition of this invention are approximately 0.1% to about 0.5% of a 1-2 mixture of triethylene diamine and dipropylene glycol together with about 0.01% to about 0.04% of an alkyl tin mercaptide such as that sold by Witco Chemical Company as their UL-22 catalyst.

The ingredients of Components A and B are mixed separately and held at essentially ambient temperature until ready for use, although they should be protected from extreme cold or extreme heat, because temperature affects the speed of reaction. In use, the two components are mixed, preferably in a blending valve, as they are pumped into the mold where the product of the invention is to be made.

EXAMPLE 1

Component A is prepared by mixing 60 pounds of a polyisocyanate sold under the trademark PAPI 27 by Dow Chemical Company, 30 pounds of Shell Chemical Company's SC-150 Solvent, and 10 pounds of propylene carbonate. Component B is prepared by mixing 31 pounds of Dow Chemical Company's Voranol 800, 64 pounds of the SC-150 Solvent, 5 pounds of propylene carbonate, 0.08 pounds of a catalyst consisting of ½ triethylenediamine and ⅓ dipropylene glycol, and 0.002 pounds of an alkyl tin mercaptide sold by Witco Chemical Company under the designation UL-22 catalyst. The two components are kept separate from each other until they are to be used, and are kept at atmospheric temperature. When the product is to be molded, separate pumps are used to pump the components into a mixing valve, where they are mixed together and then fed into a mold made of polyethylene sheet, until the mold is filled. After a wait of five minutes, the mold is removed, leaving a solid tapered protector which is highly resistant to injury from sharp blows. The protector is also securely adhered to the pipe and to the anode.

EXAMPLE 2

In preparing a polyurea according to this invention Component A is preparing by mixing 64 pounds of the PAPI 27 polyisocyanate, 26 pounds of SC150 solvent, and 10 pounds of propylene carbonate. Component B is prepared by mixing 31 pounds of JEFFAMINE T-403, 64 pounds of the SC150 solvent, 5 pounds of propylene carbonate, 0.08 pound of catalyst consisting of ⅓ triethylenediamine and ⅔ dipropylene glycol, and 0.002 pound of Witco's UL-22 catalyst. The components are handled the same way as in Example 1, producing a fast-setting polyurea. Five minutes after pouring into the mold, the mold is removed, resulting in a solid tapered protector which is highly resistant to injury by sharp blows.

Figure 5:
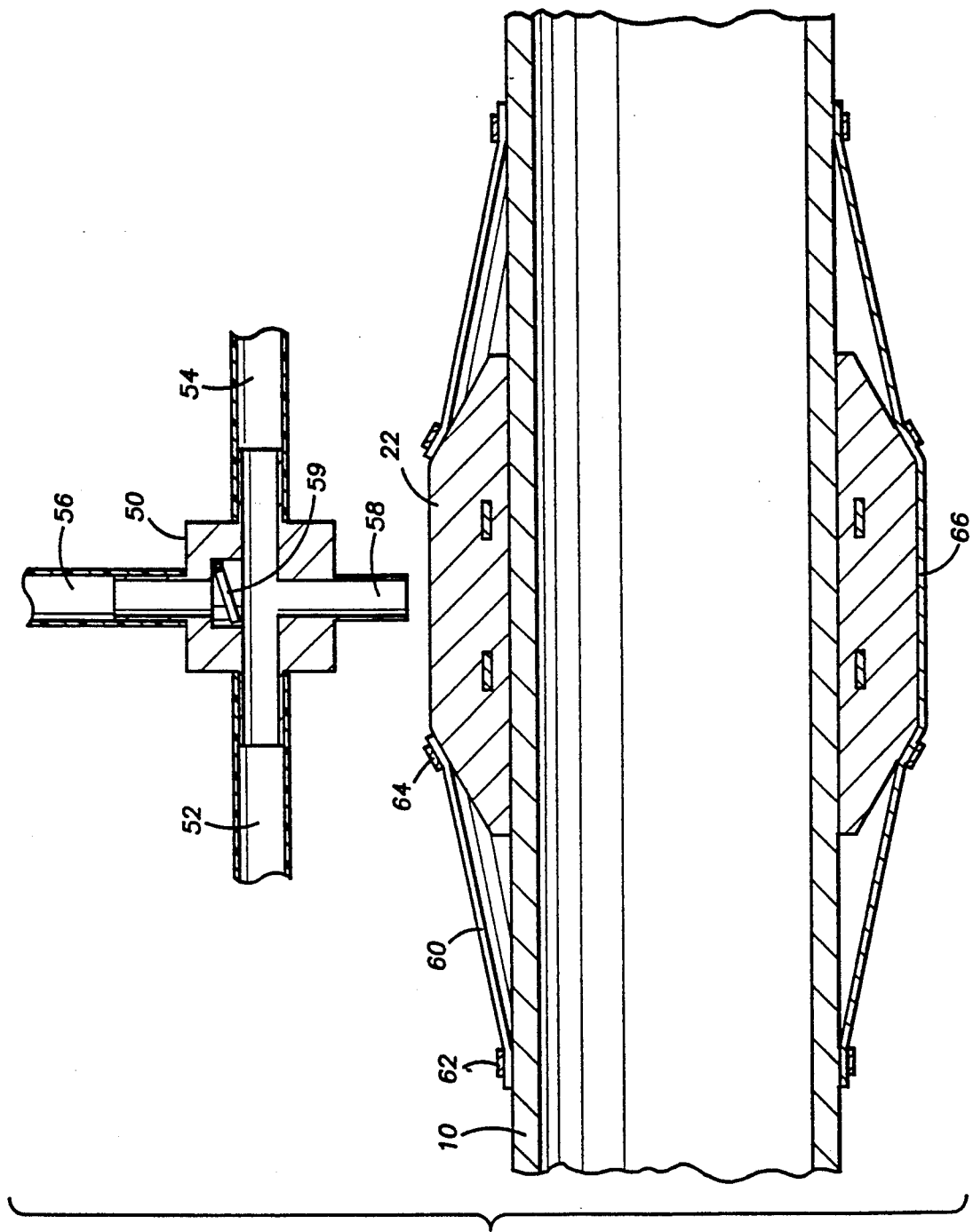
FIG. 5 is a vertical sectional view showing one embodiment of the method for applying the tapered anode protector of this invention.

FIG. 5 shows a suitable mold structure and a schematic drawing of a mixing valve for providing the mixture of components to the mold. The valve 50 includes an inlet 52 for one of the components, an inlet 54 for the other component, an air inlet 56 and an outlet 58. The valve is suspended with the outlet 58 above one of the gaps between two adjacent anode segments 22. The tapered protector is formed by a piece of sheet material 60 which is wrapped around the pipe and the end of the anode and held in place by means of an adhesive tape or straps 62 and 64. An adhesive tape such as duct tape works well for this purpose. If desired, a sheet of reinforcing material, such as a mat of glass fiber, may be wrapped around the pipe adjacent the end of the anode before the mold sheet 60 is installed. A further sheet of reinforcing material may be applied around the interior surface of the mold. The mold sheet may be made of polyethylene, polypropylene, or any of the other suitable demoldable materials, such as those described in U.S. Pat. No. 3,983,064. Alternatively, the mold may be made of two pieces of sheet steel which are hinged together and clamped around the pipe. The steel mold will require a release agent, such as wax or oil, to prevent it from sticking to the molded protector. Preferably, a sheet of corrugated paperboard is used as a release membrane. The paperboard is fitted within the steel mold so that the polyurethane composition is prevented from contacting the mold. The paperboard is biodegradable, so may be left on the completed anode protector.

A piece of adhesive tape 66 may be placed across the lower gap between the anode segments 22 and strips of reinforcing material may be placed on the pipe and on the tape 66. Such reinforcing material may also be placed on the pipe in the upper gap between the anodes.

When the molds are in place, the two components A and B are then pumped through the conduits 52 and 54 and are mixed within the valve 50 and the mixture deposited in the upper gap. This mixture has a very low viscosity, usually not greater than about 100 centipoises, so that it flows readily into the space confined within the mold sheets 60 and the tape 66 and easily permeates the reinforcing material. When the mold has been filled to the top of the upper gap, flow is stopped and a piece of reinforcing material, if desired, is placed on top of the liquid material to close the top of the upper gap. The valve may then be cleaned out by blowing air through the conduit 56 in order to prevent the material from solidifying within the valve and the conduits. A check valve 59 prevents the liquid components from entering the air inlet conduit 56.

After the mold is filled, the composition will set in a very short time, preferably not over about 5 minutes, and the mold sheets can then be removed. The product is a smooth tapered impact resistant protector for the ends of the anode segments. Because the polyurethane has a high adhesive strength on the steel pipe as well as the anode, the protector helps to prevent the anode from being damaged or knocked loose from the pipe, or from sliding along the pipe. Its ability to prevent such damage is enhanced by allowing the polyurethane to flow into the space between the anode segments and the pipe so that it acts as a glue to hold the anode segments to the pipe. In addition, the smooth taper insures that the anode can ride down the stinger without hanging up on the cross members. When tensioners are required, they can ride over the anodes, so only one tensioner is required, and the anodes can be attached before the pipeline passes through the tensioner.

This invention is not limited to the embodiments shown and described, but instead extends to all variations which are included within the scope of the following claims.

We claim:

1. A method for forming a protector for a segmented anode encircling a pipeline with gaps between the anode segments which comprises placing a mold having a frusto-conical shape on each end of the anode with the base of the frustum around the end of the anode and the frustum terminating at the outside surface of the pipeline at a plane spaced away from the end of the anode;

clamping the base end of each mold around the anode and clamping the other end of each mole around the pipeline to form a cavity between the mold and the pipeline at each end of the anode;

enclosing all but one of the gaps to form cavities between the anode segments;

positioning the one gap so it faces upward with the pipeline substantially horizontal, injecting a mixture of unreacted liquid components of a rapid setting elastomeric polymer into the one gap until all the cavities and the one gap are filled, allowing the components to react until the polymer sets up, and removing the mold.

2. A method as defined by claim 1 and including placing a mat of fibrous material around the pipeline adjacent each end of the anode before the frusto-conical mold is installed.

3. A method as defined by claim 1 and including placing a mat of fibrous material around the inside of the mold before the mold is installed.

4. A method as defined by claim 1 wherein the polymeric material is a polyurethane composition which sets up in no more than about five minutes after the cavities are filled.

5. A method as defined by claim 1 wherein the polymeric material is the reaction product of
   A. an amine initiated polyol having an OH equivalent weight of from about 50 to about 250,
   B. an organic polyisocyanate,
   C. a liquid modifier having a boiling point above about 150° C.,
   D. at least one polyurethane catalyst, and
   E. an organic carbonate liquid modifier.

6. A method as defined by claim 1 wherein the polymeric material is the reaction product of
   A. an amine terminated polyether which has an amine equivalent weight in the range of about 50 to about 100,
   B. an organic polyisocyanate,
   C. a liquid modifier having a boiling point above about 150° C.,
   D. at least one polyurea catalyst, and
   E. an organic carbonate liquid modifier.

7. A method as defined by claim 1 wherein the polymeric material is the reaction product of approximately equal parts by volume of
   A. a mixture of a liquid organic polyisocyanate, and an aromatic petroleum distillate having a flash point of at least 200° F. and a liquid organic carbonate, the weight of distillate being from about 30% to about 70%, the weight of organic carbonate being from about 10% to about 30%, both based on the weight of polyisocyanate,
   B. a mixture of an amine initiated polyol having an OH equivalent weight of from about 50 to 250, an aromatic petroleum distillate having a flash point of at least 200° F., a liquid organic carbonate and at least one polyurethane catalyst, the weight of distillate being from about 150% to about 300%, the weight of organic carbonate being from about 10% to about 30%, all based on the weight of the polyol, and the amount of catalyst being selected so as to achieve a set time of not more than about five minutes after the cavities are filled.

8. A method as defined by claim 1 wherein the mixture of unreacted liquid components has a viscosity not greater than about 100 centipoises.

* * * * *